J. C. W. GRETH & M. F. NEWMAN.
WATER PURIFYING APPARATUS.
APPLICATION FILED MAY 16, 1914.

1,149,750.

Patented Aug. 10, 1915.

WITNESSES

INVENTORS:

UNITED STATES PATENT OFFICE.

JOHN C. W. GRETH AND MARTIN F. NEWMAN, OF PITTSBURGH, PENNSYLVANIA, ASSIGNORS TO WM. B. SCAIFE & SONS COMPANY, OF PITTSBURGH, PENNSYLVANIA, A CORPORATION OF PENNSYLVANIA.

WATER-PURIFYING APPARATUS.

1,149,750.   Specification of Letters Patent.   Patented Aug. 10, 1915.

Application filed May 16, 1914. Serial No. 838,981.

*To all whom it may concern:*

Be it known that we, JOHN C. W. GRETH and MARTIN F. NEWMAN, citizens of the United States, residing at Pittsburgh, in the State of Pennsylvania, have invented certain new and useful Improvements in Water-Purifying Apparatus, of which the following is a specification.

Our invention relates more particularly to continuous water purifying systems, wherein the water is treated to chemical reagents for the formation of compounds with, and precipitation of, impurities, and then the said impurities are partly settled and partly removed by filtration; and our invention contemplates improvements by which the chemical reaction is further refined, and the detritus not settled is removed, and meantime the filter system is maintained in a substantially constant condition of cleanliness, without interrupting the flow through the purifying system.

Figure 1:
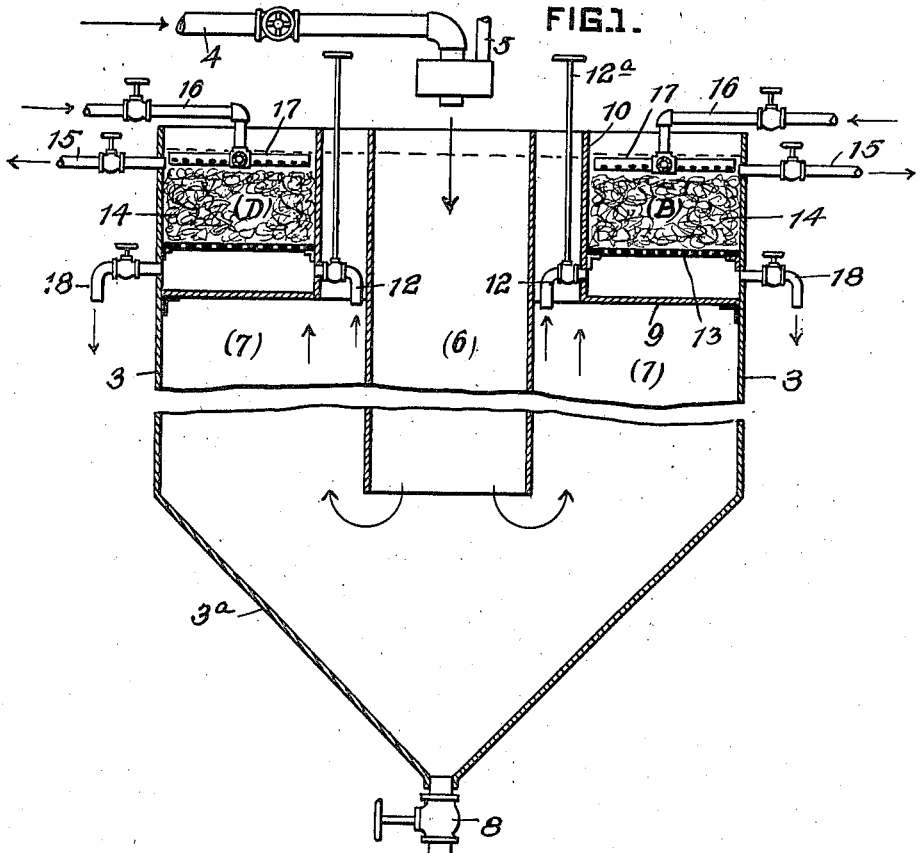
Figure 2:
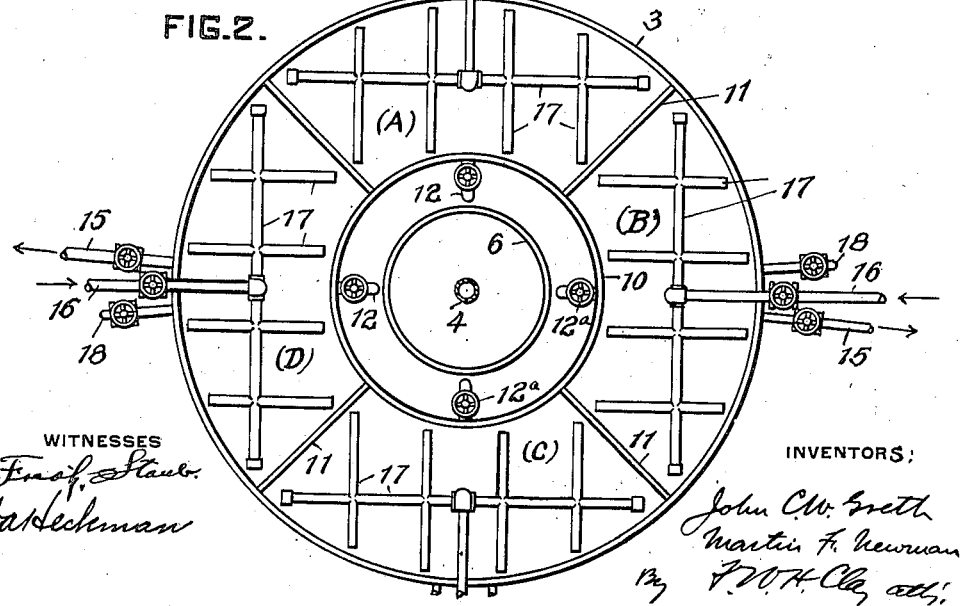

In the accompanying drawings we have shown one form of our invention, Figure 1 being a vertical central section showing reaction, settling and filtering compartments, and Fig. 2 a plan of the same.

Heretofore, while the advantages of fiber filters for certain purposes were well known, there has been no continuous treatment and filtration system employing fiber filters, because it was necessary in order to wash the filter that the plant be shut down and the settling tank emptied, or else the foul wash water with accumulated detritus flowed back into the settling chamber. Where there have been isolated washable fiber filters or excelsior filters, it has been considered necessary to locate them outside of the settling tank.

Our object is to avoid these difficulties, for which purpose we employ a series of separately and easily isolatable filter units provided with means for washing them in place in the settling tank, or renewing filter material, without interrupting the flow of water through the system, or contaminating the water in the settling compartment.

In the accompanying drawing we represent at 3 the settling tank of a continuous water purifying system, which it will be understood includes means for mixing chemical reagents with the water, a reaction compartment, a settling compartment and a filtering system. The inlet of the raw water is the valved pipe 4, and chemical may be introduced at the pipe 5, and the main part of the reaction may take place in the central chamber (6), from the bottom of which the water flows upward in the chamber (7). The valved pipe 8 leads to the sewer to carry off detritus collected on the inclined bottom $3^a$. As appears clearly from the plan view Fig. 2, we may conveniently provide a series of four filters (A), (B), (C), (D), surrounding the compartment 6 and attached to the side of the settling tank 3, at the top of the same. These filters, formed by bottoms 9, side walls 10 and partitions 11, are each one entirely separate and independent from the others (Fig. 1). The water, after settling enters the filter, from the pipe 12, controlled by a valve whose stem $12^a$ extends to the top of the system, and thence flows upward through perforated plate 13, through fibrous material such as excelsior 14, and out through a valved delivery pipe 15.

These fiber filters need frequent washing in order to keep them in a uniform clean condition, and for this purpose we provide a wash water supply pipe 16 with spray nozzles 17, and a flushing outlet pipe 18 also provided with a valve. For washing any one of the filters, the valves of pipes 12 and 15 are closed, and the valves of pipes 16 and 18 opened, thus isolating the filter unit from the settling tank and from the clean water reservoir, reversing a flow of wash water downward through the excelsior filter and carrying out the detritus at pipe 18, without contaminating the water in the settling tank or changing the water level therein. Meanwhile the other three filters A, C, and D are continuing to supply purified water. As one filter is preferably washed at a time and at regulated intervals, the purified water is continually taken from three filters respectively in three conditions of cleanliness, so that there is an average uniform treatment of the water with average uniformly clean filters. Of course, the filters may be washed in any other convenient way, provided that they are washed in place and are washed without interrupting the supply of purified water and without contaminating or disturbing the settling tank or the purified water supply. We regard this as novel in the art, as we do not know of any previous use of excelsior filters which could be washed without contamination or disturbing the water in the settling tank and the consequent necessity of shutting down the system and stopping the supply of purified water. The frequently necessary renewal of the excelsior or wood fiber in the filter units is accomplished in the same way by isolating the unit. It is to be noted that since in the passage of treated water through a fiber filter, an important part of the chemical reaction is carried on in the filter, by deposits on the fibers, and that this action depends upon the amount of such deposit, the filter is in reality a part of the treating apparatus, and the uniformity of treatment is dependent upon the average condition of the three filters always in actual use. The best results are obtained by the rotation of the cleanings so that at any particular time the average condition of the filtering medium in the whole set of filters is the same as at any other time.

Having thus described our invention and illustrated its use, what we claim is the following:

1. A water purifying system comprising means for mixing and treating water with reagents, an upward flow settling tank and an up-flow fiber filter system comprising a plurality of independent units supplied from the settling tank, isolatable from each other and from the settling tank, and having means to wash them in place independently.

2. In a continuous water purifying system, the combination of a reaction chamber, a settling chamber, water and reagent inlets to said chambers, a filter system comprising a series of independent up-flow excelsior filters attached to the top of the settling chamber, a valved opening connecting the bottom of each of said filters with said settling chamber, and a washing spray pipe above the filter material and a discharge outlet below the filter material for carrying off soiled water in washing, substantially as described.

In testimony whereof we have hereunto signed our names in the presence of the two subscribed witnesses.

JOHN C. W. GRETH.
MARTIN F. NEWMAN.

Witnesses:
Jo. BAILY BROWN,
FRED'K STAUB.